United States Patent

[11] 3,622,712

[72] Inventors Robert Milton Moore
Skillman;
Charles John Busanovich, Pinceton, both of N.J.

[21] Appl. No. 854,163
[22] Filed Aug. 29, 1969
[45] Patented Nov. 23, 1971
[73] Assignee RCA Corporation
Continuation-in-part of application Ser. No. 740,265, June 26, 1968, now abandoned. This application Aug. 29, 1969, Ser. No. 854,163

[54] DEVICE EMPLOYING SELENIUM-SEMICONDUCTOR HETEROJUNCTION
14 Claims, 8 Drawing Figs.

[52] U.S. Cl. .......... 179/100.41 K, 117/106 A, 117/217, 179/100.41 V, 179/110 D, 317/235 N, 317/241
[51] Int. Cl. .......... H04r 21/04, H01l 3/04, H01l 7/08
[50] Field of Search .......... 179/100.41 K, 100.41 PE, 100.41 R, 100.41 T; 317/241, 235 M

[56] References Cited

UNITED STATES PATENTS

| | | | |
|---|---|---|---|
| 2,908,592 | 10/1959 | Strosche | 317/241 |
| 3,377,588 | 4/1968 | Picquendar et al. | 317/235 M |
| 3,409,464 | 11/1968 | Shiozawa | 317/235 M |
| 3,427,410 | 2/1969 | Diamond | 179/100.41 ST |
| 3,473,095 | 10/1969 | Griffiths | 317/241 |

OTHER REFERENCES

Abstract 940 of Piezoelectric Effect in Se Gobrecht, et al., Zeiterschrift fur Physik, v. 148, No. 2. 1957.

*Primary Examiner*—Bernard Konick
*Assistant Examiner*—Raymond F. Cardillo, Jr.
*Attorney*—Glenn H. Bruestle

ABSTRACT: A semiconductor device comprising contiguous layers of crystalline selenium and cadmium selenide with a P-N heterojunction therebetween disposed on a high work function electrode. A thin tellurium film is disposed between the electrode and the selenium layer, and acts as a buffer to provide compatibility between the selenium crystalline structure and the structure of the underlaying electrode.
When employed as a stress-sensitive transducer, the device is disposed on a flexible substrate. The device may also be employed as a thin-film diode.

INVENTOR
ROBERT M. MOORE &
CHARLES J. BUSANOVICH
BY [signature]
ATTORNEY

INVENTORS
ROBERT M. MOORE &
CHARLES J. BUSANOVICH
BY
ATTORNEY

DEVICE EMPLOYING SELENIUM-SEMICONDUCTOR HETEROJUNCTION

This application is a continuation-in-part of an application filed June 26, 1968, Ser. No. 740,265, which is assigned to the assignee of the present invention, and is now abandoned.

BACKGROUND OF THE INVENTION

This invention relates to the field of semiconductor devices which employ P-N heterojunctions. In particular, the invention relates to semiconductor transducers of a type whose operation is affected by boundary conditions at the interface between dissimilar semiconductor materials, and to thin-film diodes which employ a heterojunction between dissimilar semiconductor materials.

Stress sensitive semiconductor devices are well known in the art. Such devices usually take the form of a body of monolithic semiconductor material having a P-N junction therein, the junction being disposed near an external surface of the device so that pressure applied to the external surface is transmitted to the junction. The stress thus created in the P-N junction region alters the voltage-current characteristics of the device, so that upon application of a potential difference between the electrodes is modulated in accordance with the applied pressure.

Such prior art devices, however, are difficult to fabricate, since the stress-applying stylus must be very precisely positioned over the P-N junction. In addition, such devices are mechanically fragile, since the P-N junction is sensitive to stress only at pressure levels near the fracture point of the semiconductor material. These devices generally exhibit temperature sensitivity, critical mechanical biasing requirements, and poor dynamic range.

While the precise basis for the stress sensitivity of such prior art transducers is not completely understood, it is believed that the primary effect of the applied stress is to change the energy gap of the semiconductor material.

The device of the present invention also relates to the field of thin-film diodes. Thin film heterojunction diodes are known in the art. For example, one such device employs a heterojunction between a semiinsulator, such as cadmium sulfide, and an insulator, such as aluminum oxide. This device is described in U.S. Pat. No. 3,331,998. However, thin-film diodes previously known in the art exhibit poor reverse-breakdown characteristics and rectification ratios.

Selenium diodes, e.g., rectifiers, are also well known. However, thin-film selenium diodes are not known in the present state of the art; one reason is due to the tendency of thin selenium layers to "peel away" from metal electrodes when crystallized from the amorphous state.

SUMMARY OF THE INVENTION

The invention provides a heterojunction semiconductor device, and a method for making the same. The device comprises(i) a high work function metal electrode, (ii) a tellurium film on the high work function electrode, (iii) a crystalline selenium layer on the tellurium film, (iv) a crystalline semiconductor layer on the selenium layer, the semiconductor layer having a crystal structure and lattice spacing closely matching that of selenium, and (v) a metal electrode on the semiconductor layer.

IN THE DRAWINGS

DETAILED DESCRIPTION

Figures 1, 2, 3, 4, 5:
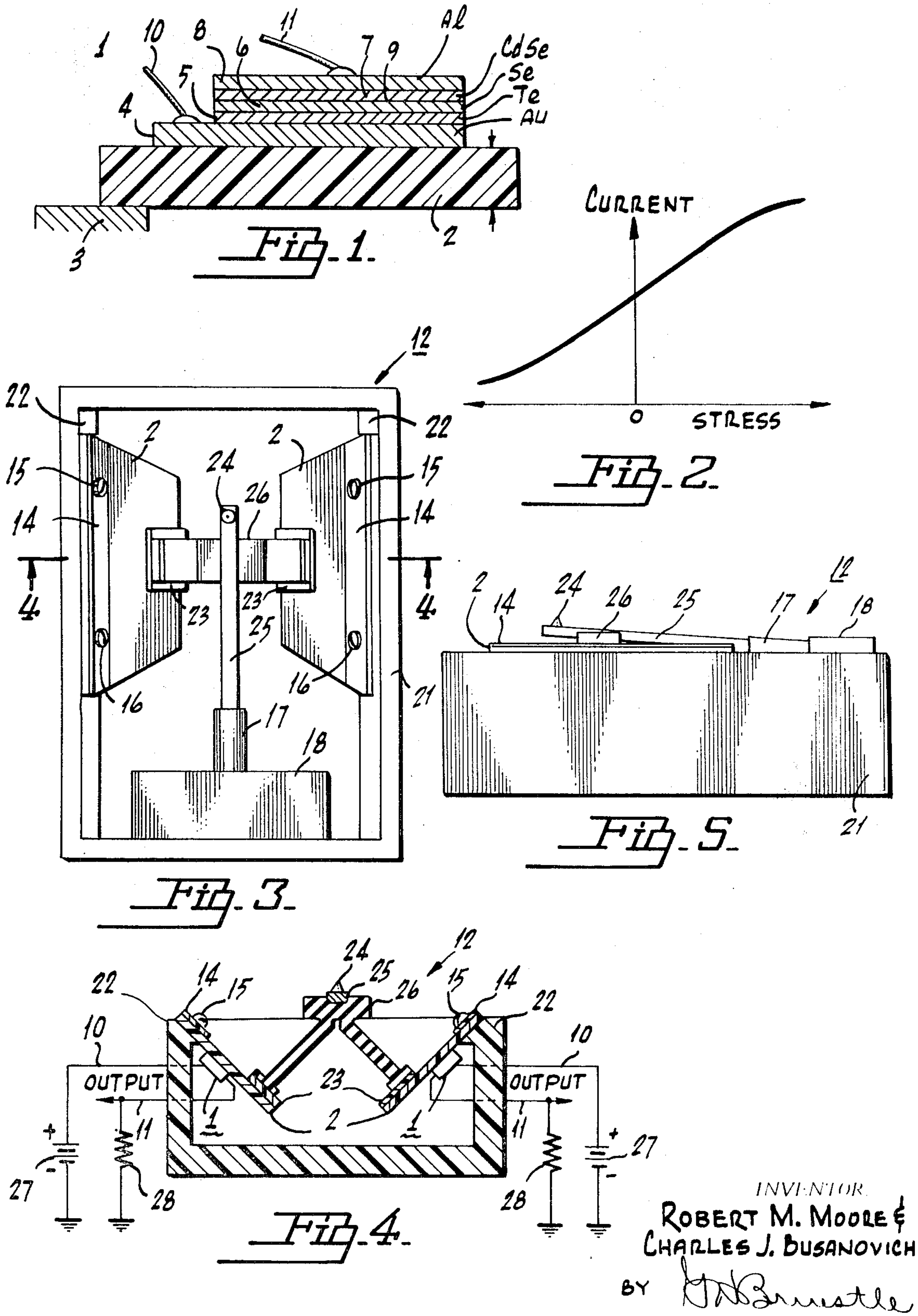
FIG. 1 shows a cross-sectional view of a stress-sensitive semiconductor device according to a preferred embodiment of the invention.
FIG. 2 shows the general shape of the stress-current characteristic of the device shown in FIG. 1.
FIGS. 3, 4 and 5 show bottom, elevational cross section, and side views, respectively, of a stereophonic pickup employing the stress-sensitive device of FIG. 1.

As described above, the present invention may be employed as a stress sensitive transducer or as a thin-film diode. Therefore, example one herein describes an embodiment of the invention as a stress-sensitive transducer preceded by a theoretical discussion of the stress-sensitive properties of the device. Example two is drawn to tn embodiment of the invention as a thin-film diode.

EXAMPLE ONE

When two semiconductor layers are in contact at an interface therebetween, and an electric field is applied to the layers (usually by means of electrodes contacting the semiconductor layers), electrostatic theory requires that the component of the dielectric displacement D normal to the interface be continuous across the interface.

Unstimulable dielectric (including semiconductor ) materials are, for the purposes of this specification, defined as those which exhibit a polarization dependent only upon the applied field and the permittivity of the dielectric material. Assuming one of the semiconductor layers to exhibit such unstimulable characteristics, and denoting this layer by the subscript 2, the displacement within the layer may be expressed as $$D_2=\epsilon_2 E_2 \qquad (1)$$

where:

$D_2$ is the normal component of displacement in the unstimulable semiconductor layer;

$\epsilon_2$ is the permittivity constant of this layer in the direction normal to the interface; and $E_2$ is the normal component of the electric field intensity in this semiconductor layer at the interface.

If the other semiconductor layer (to be denoted by the subscript 1 ) is of the type which exhibits a field-independent polarization component ( in addition to the unstimulable field-dependent component of polarization), the dielectric displacement within this layer may be expressed in the form $$D_1=P(\xi)+\epsilon_1 E_1 \qquad (2)$$

where:

$D_1$ is the normal component of dielectric displacement in the field-independent semiconductor layer;

P is the field-independent polarization in this layer at the interface;

$\xi$ is an externally applied stimulus, which may take the form of (i) stress, (ii) heat, (iii) a previously applied field, or (iv) any other stimulus which produces field-independent polarization effects;

$\epsilon_1$ is the permittivity of this semiconductor layer in a direction normal to the interface; and $E_1$ is the normal component of electric field intensity in this semiconductor layer at the interface.

The term "material exhibiting field-independent polarization" is meant to include materials which exhibit piezoelectric, pyroelectric or ferroelectric effects, or any similar effect in which the polarization of the material is variable in response to a stimulus other than the electric field present in the material.

As previously mentioned, the normal component of dielectric displacement must be continuous at the interface between the aforementioned unstimulable and field-independent material) semiconductor layers. This condition is expressed by equating equations (1) and (2) to give $$\epsilon_2 E_2-\epsilon_1 E+P(\xi) \qquad (3)$$

In the particular case where the field-independent semiconductor material is piezoelectric;

$$P(\xi)=e_1 S \qquad (4)$$

where

S is the applied stress in a direction normal to the interface, and $e_1$ is the piezoelectric constant of the field-independent semiconductor material. Combining equations (3) and (4)

$$\epsilon_2 E_2 - \epsilon_1 i\, E_1 = e_1 S \qquad (5)$$

From equation (3), it is clear that an external stimulus of the type which alters the field-independent polarization of one of the semiconductor materials at the interface will alter the electric field conditions at the interface. Alteration of these electric field conditions involves a change in barrier height at the interface as well as a realignment of charge carriers in both semiconductor layers, i.e., a change in depletion layer width at the interface.

Equation 5 indicates that application of stress to a piezoelectric semiconductor which is in contact with a nonpiezoelectric semiconductor results in a change in the electrical parameters of the composite structure, due to a realignment of charge carriers and change in barrier height in the interface between the semiconductor regions. A stress-sensitive semiconductor device may be constructed by providing a heterojunction between two semiconductor layers having different piezoelectric constants (one of the piezoelectric constants may be zero); the foregoing discussion provides a basis for consideration of the operation of such a device.

Equations (3) and (5) may be extrapolated to the more general case of contiguous semiconductor layers which possess different field-independent polarization characteristics. Application of a stimulus to such a structure likewise results in a change in the electric field conditions at the interface between the semiconductor regions, characterized by a change in barrier height and realignment of charge carriers at the interface. In the case where one of the semiconductor materials does not exhibit field-independent polarization, the corresponding polarization factor is zero, and equations (3) and (5) apply.

While the two semiconductor layers may be of the same conductivity type, we prefer to employ layers of mutually different conductivity types, so that a P-N heterojunction is formed at the interface therebetween. Such a P-N heterojunction can be either an injecting or a high-recombination interface type. A P-N heterojunction of the injecting type, when forward biased, exhibits minority carrier injection, and a number of special transducer structures may be realized utilizing this injection mechanism. The high recombination type of P-N heterojunction does not exhibit minority carrier injection, and is more limited in its applications. For example, either type of P-N heterojunction may be forward biased by means of a voltage source connected in series with a resistor, so that application of stress to the junction results in modulation of current flow across the junction, manifested by a change in the voltage appearing across the resistor.

Alternatively, either type of P-N heterojunction may be reverse biased, and a similar circuit employed to monitor the variation in reverse 'leakage' current across the junction. The reverse biased P-N heterojunction may be employed as a capacitive transducer, a suitable circuit being employed to monitor the variation in capacitance (due primarily to the change in depletion layer width) of the heterojunction structure in response to applied stress.

Using the injecting type of P-N heterojunction,still another stress-sensitive transducer may be constructed in the form of a heterojunction between semiconductor regions of mutually different conductivity type, at least one of these regions being piezoelectric, the particular materials and impurity concentration levels being chosen so that the heterojunction, when suitably biased, exhibits light emission.

Such a heterojunction may be formed between gallium phosphide and gallium arsenide-phosphide to provide a device which emits visible light. The application of stress to this device results in a corresponding variation in current flow across the P-N heterojunction, with consequent modulation of the light emitted therefrom.

A light-emitting heterojunction structure of the general type described above may be provided with cleaved and/or polished oppositely disposed surfaces, normal to the heterojunction plane, to form an optical cavity so that the device functions as a laser. Suitable materials for such a laser structure are gallium arsenide and gallium arsenide-phosphide, $GaAs_{1-x} P_x$, where $x<0.44$. When the P-N heterojunction of this structure is stressed, the amplitude of the coherent light emitted therefrom varies in accordance with the applied stress. In this case, the biasing means must of course be such as to provide a current density at the heterojunction which is in excess of the threshold value required to produce laser action.

In order to provide a P-N heterojunction of the type described which exhibits good injection characteristics, it is desirable that the semiconductor layers be crystalline (defined for the purpose of this specification as (i) monocrystalline or (ii) macroscopically polycrystalline, relatively large individual crystallites being preferred), especially in the vicinity of the interface therebetween, with a minumum of crystal defects at the interface. In order to minimize such crystal defects, the materials which comprise the adjacent semiconductor layers should have closely matching crystal structures and crystal lattice constants.

We have found that selenium is a desirable semiconductor to substitute for the unstimulable material of one of the semiconductor layers. Selenium possesses a hexagonal crystal form which closely matches the crystal structure and lattice spacing of a number of piezoelectric semiconductor materials.

Some materials which have been found to form a highly stress sensitive P-N heterojunction with hexagonal crystalline selenium are cadmium sulfide (CdS), arsenic sulfide ($As_2S_3$), arsenic selenide ($As_2Se_3$), antimony sulfide ($Sb_2S_3$), antimony selenide ($Sb_2Se_3$), and cadmium selenide (CdSe).

A stress-sensitive semiconductor device 1 employing a selenium-cadmium selenide heterojunction is shown in FIG. 1. The device 1 comprises a flexible substrate 2 which may comprise either a metallic or an insulating material. The substrate 2 may comprise a thin insulating material such as glass, mica, alumina, beryllia, acrylic plastic or polyimide. We prefer, however, to employ for the material of the substrate the polyimide the polyimide resin sold by E. I. duPont Company under the trade designation Kapton. Polyethylene terephthalate, a material sold by E.I. duPont Company under the trade designation Mylar, is also suitable.

One edge of the substrate 2 is secured to a fixed support 3 in cantilever fashion. The substrate 2 may be flexed by application of force in the directions indicated by the arrows at the edge of the substrate 2 which is opposite the fixed support 3.

A thin layer 4 comprising gold is disposed on and adherent to one surface of the substrate 2. The gold layer 4 may typically have a thickness on the order of 500 Angstroms.

Disposed on the gold layer 4 is a thin evaporated layer 5 comprising tellurium. The tellurium layer 5 adheres well to the gold layer 4 and has a crystal structure and lattice constant which closely matches the corresponding parameters of the overlying selenium layer 6. The tellurium layer 5 may have a thickness ranging from a few atomic diameters to approximately 1 micron.

The selenium layer 6 overlies the tellurium layer 5 and forms an active semiconductor region of the device 1. The selenium layer 6 may typically have a thickness in the range of 0.1 to 2 microns.

The tellurium layer 5 acts as a crystallographic "buffer" to match the crystalline structure of the selenium layer 6 to the totally different structure of the gold electrode layer 4.

Disposed on the selenium layer 6 is a piezoelectric semiconductor layer 7 comprising cadmium selenide. The cadmium selenide layer 7 may typically have a thickness on the order of 100 to 10,000 Angstroms. The cadmium selenide layer 7 is crystalline with a hexagonal crystal structure substantially epitaxial with the underlying selenium layer 6.

Disposed on the cadmium selenide layer 7 is an electrode layer 8, which may comprise aluminum or any other suitable metal capable of providing ohmic contact to the layer 7.

The interface between the selenium layer 6 and the cadmium selenide layer 7 defines a P-N junction plane 9. Upon application of a potential difference between the electrode layers 4 and 8 by means of the corresponding terminal leads 10102617 0614

10 and 11 to forward bias the P-N junction 9, current flows across the P-N junction 9, the current being modulated in amplitude in accordance with flexing of substrate 2 when force is applied thereto in the direction indicated by the arrows in FIG. 1. Flexing of the substrate 2 creates stress at the P-N junction plane 9 which, as previously described, results in changes in barrier height and charge carrier distribution at the junction.

With the structure described above, the compliance and other mechanical properties of the stress-sensitive device are determined primarily by the substrate material, while the electrical properties thereof are determined by the semiconductor materials defining the stress-sensitive heterojunction. Therefore, these desired mechanical and electrical properties may be independently specified, providing a high degree of flexibility in the resultant device characteristics obtainable.

Although gold is employed as the material of the electrode electrically coupled to the selenium layer 6, other high work function metals may be employed. These electrode metals should preferably have a work function larger than 4 ev. Other suitable metals in this category are nickel, silver, chromium, and bismuth. While copper has a work function in the range described, we have found that copper diffuses through the tellurium layer 5 into the semiconductor material to deteriorate the electrical characteristics thereof. However, copper may be employed as the electrode material if the thickness of the tellurium layer 5 is made sufficiently great.

The techniques involved in providing good electrodes to selenium are described in an article by H. Schweickert, appearing in Verhandl. deut. physik, Ges. 3, 99 (1939).

The selenium layer 6 exhibits P-type conductivity, and the cadmium selenide layer 7 exhibits N-type conductivity, so that the bias source connected between the terminal leads 10 and 11 should be of such polarity as to make the terminal lead 11 more negative than the lead 10. While the source of potential difference (not shown) may comprise an alternating voltage generator (the P-N junction 9 acting to produce rectification), we prefer to employ a unidirectional source.

FIG. 2 shows the form of the applied stress versus forward bias current flow characteristic for the device of FIG. 1. It is seen that the device 1 exhibits maximum sensitivity, i.e., maximum variation of current for a given applied stress, in the region of zero stress. As the stress is increased in the positive (tension) or negative (compression) direction, the current changes substantially linearly in response to changes in stress and saturates asymmetrically with large increases in stress. Thus it is seen that no mechanical biasing is required to provide high-device sensitivity.

The stress-sensitive device 1 may be fabricated by the following process.

The gold electrode layer 4 is formed by evaporating gold onto the Kapton substrate 2, the substrate 2 being maintained substantially at room temperature. This gold evaporation step, as well as all subsequent evaporation steps, is carried out in a vacuum of $10^{7E-4}$ to $10^{7E-6}$ torr. Thereafter, a thin tellurium layer 5 is evaporated onto the gold layer 4. This step is followed by evaporated onto the gold layer 4. This step is followed by evaporation of the selenium layer 6 onto the tellurium layer 5.

After evaporation the selenium layer is amorphous. At this point in the manufacturing process the substrate is removed from the vacuum system and heated in air at 100° to 210° C. for several minutes until the red transparent amorphous selenium is crystallized. Crystallization of the selenium is evidenced by conversion thereof to a gray opaque layer.

The thin tellurium layer 5 serves to aid in crystallization of the selenium layer 6, and to permit the crystallization to occur at a lower temperature in a shorter time than would otherwise be required. The tellurium layer 5 also serves to prevent the selenium layer 6 from cracking or peeling during and after the crystallization step.

After the selenium layer has been crystallized (to a gray hexagonal crystal form ), the substrate is returned to the vacuum chamber and a thin crystalline cadmium selenide layer 7 is evaporated onto the selenium layer 6.

Finally, a very thin layer of indium (to insure an ohmic contact), followed by a conductive aluminum electrode layer 8, is evaporated on the cadmium selenide layer 7.

The resultant device 1 may be protected from environmental contamination by coating with a suitable encapsulant (not shown).

The stress transducer 1 may be utilized in various devices where information in the form of stress variations is to be converted to an electrical signal, or for the electrical measurement of strain. Such applications are described, e.g., in an article by R. Moore entitled "Semiconductor Gauges Make Sense in Most Transducer Applications," published in Electronics, Mar. 18, 1968, p. 109.

One such application is the conversion of the information contained on a record into a corresponding electrical signal. This information is recorded in the form of undulations in the record groove. The information may correspond to audio or video signals, or both. In a stereophonic record, two sets of undulations are present, one being formed on each side face of the V-shaped record groove.

A stereophonic pickup 12 is shown in FIGS. 3, 4 and 5. The pickup 12 comprises a frame 21, and a pair of stress sensitive devices 1 each having a substrate 2. One edge of each of the substrates 2 is secured to a rigid strip 22 on a corresponding part of the frame 21 by means of a pressure plate 14, and a pair of screws 15 and 16 which extend through the plate into the strip 22. The frame 21 and strips 22 may preferably comprise a relatively rigid plastic insulating material such as Lucite. Relatively rigid strips 23 are bonded to corresponding edges of each substrate 2 opposite the edges of the substrate which are secured to the Lucite strips 22. A stylus 24 having a support strip 25 is coupled to the strips 23 by means of a yoke 26. The yoke 26 is preferably comprises an elastomeric material such as rubber, and serves to couple movements of the stylus 24 (due to the undulations of the record groove) to the substrates 2, in such a manner that each of the substrates 2 is flexed in accordance with the undulations of a corresponding side face of the V-shaped record groove.

The stylus 24 is mounted on one end of the stylus support strip 25, which is suspended by the yoke 26. The opposite end of the strip 25 is secured to a flexible extension 17 which is attached to a rigid mount 18, which is, in turn, affixed to the frame 21. The extension 17 may comprise any flexible material, such as rubber. The mount 18 may also comprise Lucite, or any ceramic material.

The terminal leads 10 and 11 of each of the stress-sensitive devices 1 are electrically connected to a unidirectional voltage source 27 through a series resistor 28. As the substrates 2 are flexed in accordance with the movement of the stylus 24, the voltage appearing across each of the resistors 28 is modulated in accordance with the stylus movement. These voltage changes represent the output of the pickup, and may be applied to a suitable amplifier or other electrical circuitry to reproduce the information contained on the record.

Although certain specific semiconductors have been described as possessing piezoelectric qualities, other semiconductors comprising (i) compounds of materials selected from Groups III and V of the Periodic Table or (ii) compounds of materials selected from Groups II and VI of the periodic Table may also be employed as piezoelectric semiconductors.

EXAMPLE TWO

Figure 6:
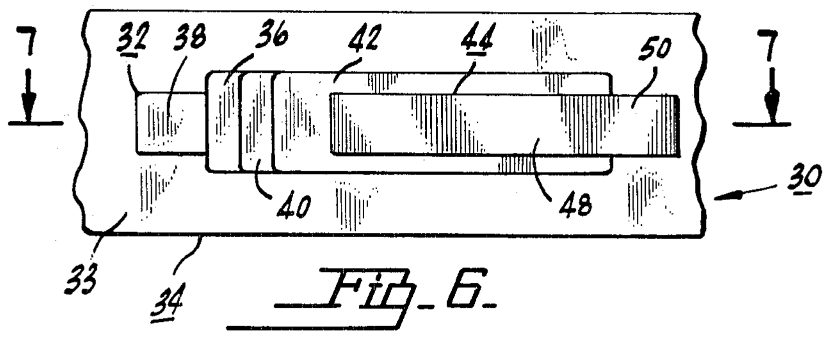
FIGS. 6 and 7 show the top and cross-sectional views, respectively, of a thin-film diode constructed in accordance with the present invention.
Figure 7:
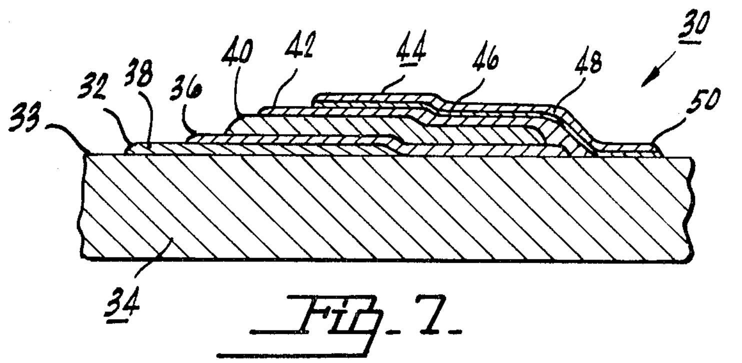

The preferred embodiment of a thin-film diode fabricated in accordance with the present invention will be described with reference to FIGS. 6 and 7. The diode essentially comprises the same structure as that described above; preferably, however, the selenium layer is thicker when a diode is to be employed, as will be discussed below.

The diode 30 comprises a high work function metal electrode 32 which is disposed on a top surface 33 of an insulating substrate 34. As discussed above, suitable materials include gold, silver, nickel chromium, copper and bismuth; however, in the diode 30, bismuth is preferred. The substrate 34 may comprise any insulating material; for instance, glass, alumina, or beryllia may be used.

A thin tellurium film 36 is disposed on the metal electrode 32 and on a portion of the top surface 33, and is disposed on the electrode 32 so as to leave exposed an electrical bond pad 38 for subsequent terminal lead bonding.

The diode 30 also includes a crystalline selenium layer 40 disposed on the tellurium film 36. Preferably, the selenium layer 40 is between 5.0 microns and 7.0 microns thick. A crystalline semiconducting layer 42 having a crystalline structure and lattice constant closely matching that of selenium is disposed over the selenium layer 40. Suitable semiconducting materials having such a crystal structure and lattice constant comprise any N-type compound which includes an element in Group VI of the Periodic Table; for example, cadmium selenide, cadmium sulfide, cadmium telluride, zinc sulfide, zinc selenide, zinc telluride, antimony selenide, and arsenic selenide may be used. However, cadmium selenide is preferred.

The diode 30 is completed with a top metal electrode 44 disposed on the exposed surface of the semiconducting layer 42 and on a portion of the top surface 33 of the substrate 34. As described in example one, the electrode 44 comprises a thin film of indium 46 disposed on the semiconducting layer 42 with an aluminum layer 48 disposed on the indium film. However, in the embodiment of the invention as a diode, a portion of the top electrode 44 is registered to a portion of the top surface 33 in order to provide an electrode bond pad 50 for subsequent terminal lead bonding.

The above described preferred embodiment of the diode 30 is fabricated in the same manner as the transducer in example one, except that the selenium layer is preferably fabricated in the following manner.

First, a thin layer of amorphous selenium about 1.0 micron thick is deposited on the tellurium film. The substrate is then removed from the vacuum system and heated in air to between 100° C. and 200° C. for several minutes until the amorphous selenium is crystallized. This amorphous deposition and recrystallization process is then repeated several times until the total thickness of the successive crystalline selenium layers is between 5.0 microns to 7.0 microns thick. While it is possible to deposit a selenium layer of the desired thickness in one amorphous deposition and recrystallization step, it has been found that the above described "successive layers" deposition yields diodes having greater rectification ratios and reverse breakdown voltages than in devices having a single, relatively thick layer of selenium.

As described above, the preferred embodiment of the diode includes a tellurium "buffer" film between the high work function electrode and the selenium layer. However, it has been found that when the high work function electrode comprises a metal having a hexagonal crystal structure, the tellurium layer may be omitted with only a slight increase in the failure rate of the device. Suitable high work function metals having a hexagonal crystal structure include nickel, chromium, silver, and bismuth Thus, an alternate embodiment of the thin-film diode 30 comprises essentially the same structure described with reference to FIGS. 6 and 7, except that the tellurium film 36 is omitted and the selenium layer 40 is deposited directly onto a high work function metal electrode 32 having a hexagonal crystal structure.

Figure 8:
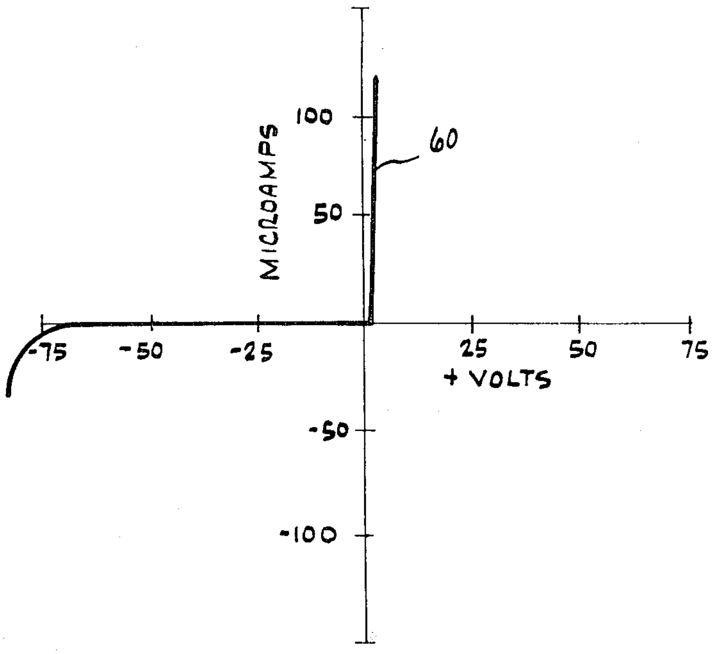
FIG. 8 is a typical I–V characteristic curve of the thin-film diode shown in FIGS. 6 and 7.

A thin-film diode fabricated in accordance with the preferred embodiment has the following advantages. First, the device exhibits a reverse breakdown voltage of about 70 volts. Reverse breakdown voltage is a measure of the highest reverse voltage at which the diode will block reverse current, before degradation of the device. FIG. 8 is an I–V characteristic curve 60 which illustrates this parameter.

Further, the preferred e embodiment of the diode provides a rectification ratio of about $1.0 \times 10^6$ at 3 volts, and a forward offset voltage of 0.5 volts. Rectification ratio is the ratio of the forward current to the reverse current at a given voltage.

A thin-film diode exhibiting the above-described parameters has many possible applications. For example, the device may be employed in existing integrated circuit technology, solid-state television circuitry, computer logic circuits, or analog-to-digital converters.

We claim:

1. A heterojunction semiconductor device comprising:
an electrode comprising a high work function metal having a work function from about 4 electron volts;
a tellurium film on said electrode;
a crystalline selenium layer on said tellurium film;
a crystalline semiconductor layer on said selenium layer, said semiconductor layer having a crystal structure and lattice constant closely matching that of selenium; and
a metal electrode on the exposed surface of said semiconductor layer.

2. A device according to claim 1, wherein said semiconductor layer is selected from a group consisting of cadmium selenide, cadmium sulfide, arsenic sulfide, arsenic selenide, antimony sulfide and antimony selenide.

3. A device according to claim 1, wherein said high work function metal is selected from a group consisting of gold, silver, nickel and bismuth.

4 A device according to claim 1, wherein said semiconductor layer has a thickness in the range of 100 to 10,000 Angstroms.

5. A device according to claim 1, in which said metal electrode on said semiconductor layer comprises:
a thin film of indium disposed on the exposed surface of said semiconductor layer, and
a layer of aluminum disposed on said indium film.

6. A device according to claim 1, wherein said tellurium layer has a thickness in the range of a few atomic diameters to 1 micron.

7. A device according to claim 6, wherein said selenium layer has a thickness in the range of 0.1 to 2 microns.

8. A device according to claim 1, further comprising a plurality of thin, successively recrystallized layers of selenium on said selenium layer.

9. A device according to claim 8, in which the total thickness of said successively recrystallized layers is between 5.0 and 7.0 microns.

10. A heterojunction semiconductor device comprising:
a high work function metal electrode having a work function from about 4 electron volts, said metal having a hexagonal crystal structure;
a crystalline selenium layer on said electrode;
a crystalline semiconductor layer on said selenium layer, said semiconductor layer having a crystal structure and lattice constant closely matching that of selenium; and
a metal electrode on the exposed surface of said semiconductor layer.

11. A heterojunction semiconductor device comprising:
a high work function metal electrode having a work function from about 4 electron volts;
a crystalline selenium layer on said electrode;
a crystalline piezoelectric semiconductor layer on said selenium layer, said piezoelectric layer having a crystal structure and lattice constant closely matching that of selenium; and
a metal electrode on the exposed surface of said piezoelectric layer.

12. A device according to claim 11, wherein said device is employed as a stress transducer, further comprising:
a flexible substrate bonded to said heterojunction device;
means for flexing said substrate to apply stress at the interface between said selenium layers;
a source of potential difference;
means including said electrodes for coupling said source to said layers; and an output circuit electrically connected to said coupling means for deriving an electrical signal in response to said applied stress.

13. A pickup for transducing signals from a record groove having information-containing undulations, said undulations being reproduced by the movement of a stylus traversing the groove, comprising:

a frame;

a stress transducer according to claim 12, a first part of the substrate of said transducer being secured to said frame; and an elastomeric member for coupling said stylus to another part of said substrate, spaced from said first substrate, so that movement of said stylus in said groove results in flexing of said substrate in accordance with said undulations.

14. A pickup for transducing signals from a V-type record groove wherein each side face of the groove has information-containing undulations, said undulations being reproduced by the movement of a stylus traversing the groove, comprising:

a frame;

a pair of stress transducers, each according to claim 12 a first part of transducer TRANSDUCER substrate being secured to said frame, and an elastomeric yoke for coupling said stylus to another part of each transducer substrate, spaced from the first part thereof, so that movement of said stylus in said groove results in flexing of each substrate in accordance with undulations of a corresponding one of said side faces.

* * * * *

Disclaimer 3,622,712.—*Robert Milton Moore*, Skillman, and *Charles John Busanovich*, Princeton, N.J. DEVICE EMPLOYING SELENIUM-SEMICONDUCTOR HETEROJUNCTION. Patent dated Nov. 23, 1971. Disclaimer filed Mar. 28, 1977, by the assignee, *RCA Corporation.*

Hereby disclaims the remaining term of said patent.

[*Official Gazette May 24, 1977.*]